Patented Mar. 28, 1950

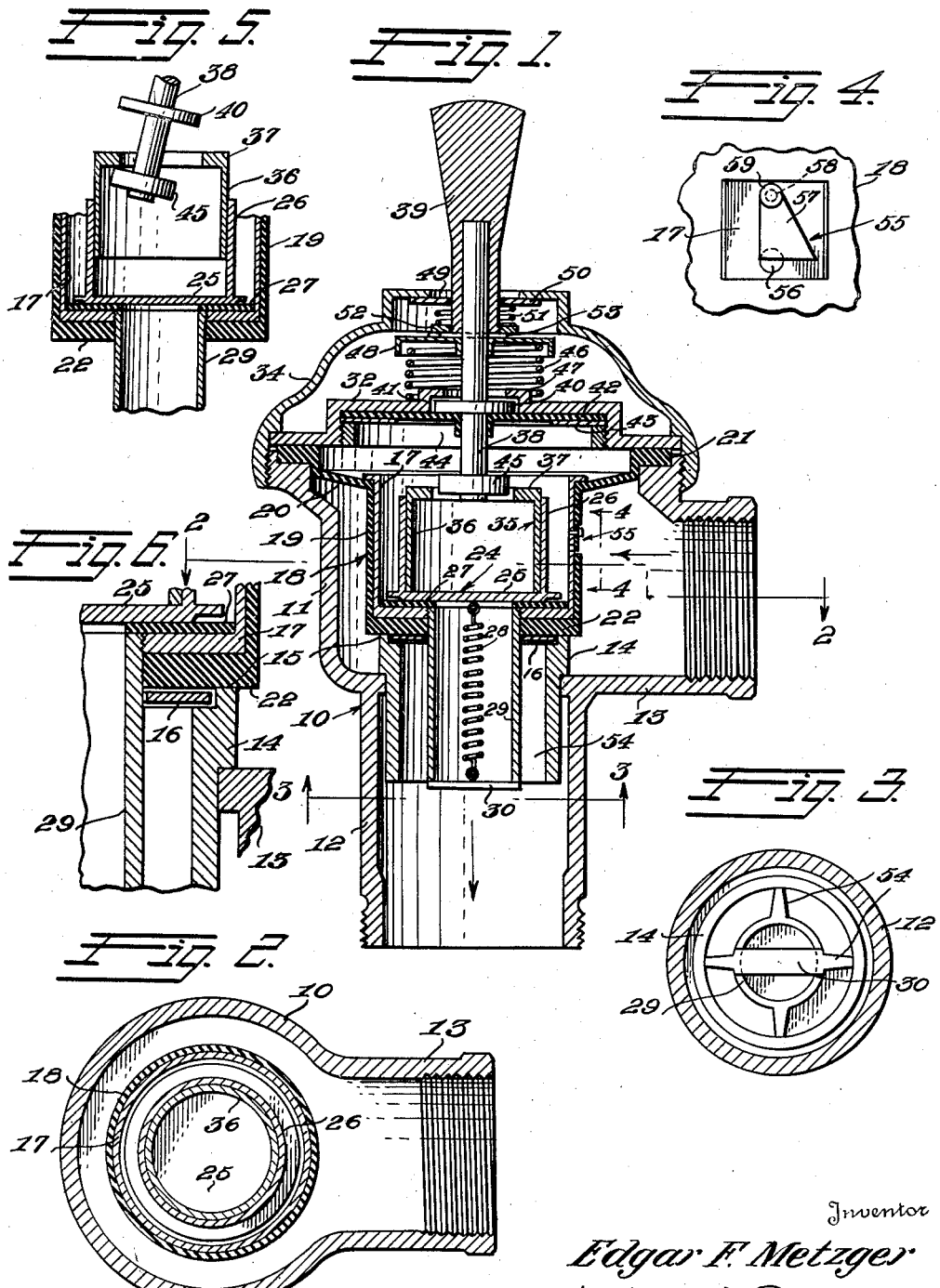

2,502,335

UNITED STATES PATENT OFFICE 2,502,335

FLUSH VALVE

Edgar F. Metzger, Logansport, Ind.

Application May 14, 1945, Serial No. 593,570

5 Claims. (Cl. 137—93)

This invention relates to improvements in flush valves, wherein provision is made for a more accurate control and cut-off of the flow, and wherein the cooperating parts are relatively few in number, associated for convenient access for repair or replacement, and arranged to provide maximum efficiency for a long period of time.

A primary object of the invention is the provision of a flush valve structure, including a primary valve normally held closed by the service water pressure, and a manually-controlled secondary valve manually operable for unbalancing the holding pressure on the primary valve to thereby effect opening of the primary valve for flushing.

The present invention is an improvement over the flush valve structure disclosed in applicant's Patent No. 2,145,772, dated January 31, 1939, and includes in its construction certain cooperating elements whereby the sensitiveness and efficiency of the valve is substantially improved over that of the patent above referred to.

The present invention is illustrated in a preferred embodiment thereof in the accompanying drawing, and wherein—

Figure 1 is a vertical sectional view of the improved flush valve structure.

Figure 2 is a horizontal sectional view on line 2—2 of Figure 1.

Figure 3 is a horizontal sectional view on line 3—3 of Figure 1.

Figure 4 is a fragmental elevational view on an enlarged scale as observed from the plane of line 4—4 of Figure 1.

Figure 5 is a fragmental vertical sectional view showing the actuating lever in its secondary valve unseating position.

Figure 6 is a similar view showing the cushion disc on an enlarged scale.

The improved valve in its preferred form comprises a casing 10 having a bowl shaped portion 11 from which depends a cylindrical delivery section 12. The bowl 11 is provided with an internally threaded portion 13 for connection of the service pipe of the water system.

The casing 10 is provided with a bushing 14 whose upper end provides a primary valve seat 15 and said end is recessed inwardly of the seat for accommodating a cushion disc 16.

The primary valve comprises a metallic bushing 17 which is externally engaged by a rubber bushing 18, the bushing 18 including an intermediate cylindrical portion 19 conforming with the bushing 17, an upper frusto-conical portion 20 terminating in an anchoring rim 21, and a lower horizontal seat engaging portion 22.

A secondary valve 24 includes a base or valve seating portion 25 and a vertical cylindrical portion 26.

The valve 24 is biased toward a seat gasket 27 by means of a spring 28 extending axially of a cylindrical member 29 whose upper end is secured to the bushing 17, the spring being secured at its upper end to the valve 24 and at its lower end being secured to a member 30 extending diametrically of the lower end of member 29.

The anchoring rim 21 of the rubber bushing 18 is engaged by a cover plate 32 and a cover 34 is threadedly engaged with the casing 10 and bears against the cover plate 32 to thereby retain the rubber bushing 18 in position.

The secondary valve 24 is adapted for manual unseating and the improved mechanism for this purpose includes a rocker sleeve 35 including a cylindrical portion 36 telescopingly engaged within the cylindrical portion 26 of the secondary valve and a horizontal rim portion 37.

The rocker sleeve is adapted for actuation by means of a lever 38 provided with a manipulating handle 39.

The lever 38 includes a fulcrum collar 40 disposed within a recess 41 in the cover plate 32, the collar being yieldably retained in the recess by means of a rubber gasket 42 engaged adjacent its periphery by a washer 43 which in turn is engaged by a retaining ring 44 threadedly engaged with the cover plate 32.

The lever 38 adjacent its lower end is provided with a boss 45 adapted for engagement with the rim portion 37 of the rocker sleeve to unseat the secondary valve 24.

The lever is biased to normal vertical position by means of a spring 46 which surrounds the lever and whose lower end engages over a flange 47 defining said recess 41 and whose upper end engages a cupped plate 48 through which the lever extends.

The cover 34 is provided with a relatively large aperture 49 for proper movement of the lever and such aperture is internally covered by a shield 50 which is biased toward the cover by means of a spring 51 whose lower end engages a nut 52 threaded on the handle and retained in position by a cotter 53, the latter limiting upward movement of the plate 48.

The primary valve is maintained in an accurate vertical path of movement by means of guide ribs 54 on the cylindrical member 29 which engage the inner wall of the bushing 14.

A by-pass 55 is provided to effect balanced pressures on opposite sides of the primary valve after flushing in order to cause the primary valve to automatically close and such by-pass is adjustable in order to selectively vary the duration of a flushing operation.

Such by-pass may desirably include an aperture 56 in the metallic bushing 17 and a plate 57 adjustable about the axis 58 to vary the effective area of the aperture. A set screw 59 may provide such axis and effect locking of the plate 57 in any adjusted position. The detail structure of the valve having been described, the operation thereof is as follows:

Water entering the service line in the direction of the arrow will have found its way through the by-pass 55 whereby equal pressures will have been established on opposite sides of the primary valve, whereby same will remain closed.

When it is desired to perform a flushing operation, the handle 39 is grasped and the lever 38 rocked about its fulcrum 40 with the result that boss 45 will engage rim 37 of the rocker sleeve 35 thereby effecting rocking of the secondary valve 24. Such rocking or lifting of the secondary valve will permit discharge of a jet of water from within the primary valve through the member 29. The resultant decrease of pressure within the primary valve, causes the unbalanced pressure to react upwardly against the frusto-conical portion 20 resulting in the lifting of the primary valve from its seat 15 to occasion a flow through the delivery 12.

The primary valve is thus partially collapsed and will gradually close as a balanced pressure is established by admittance of service water through the adjustable by-pass 55.

Even if the handle is held in flushing position, the primary valve will rise high enough for the rocker sleeve rim portion 37 to clear the boss 45, whereupon the secondary valve will instantly reseat to maintain the partial vacuum within the primary valve. The rocker sleeve in this contingency is suspended on the boss 45, Fig. 5, as the primary valve descends. When the handle is released the rocker sleeve drops to normal position. Consequently the flow is of uniform duration regardless of whether the handle is released or held open.

As is more clearly indicated in Fig. 6, the cushion disc 16 has an unrestricted vertical range of movement of approximately $\frac{3}{32}$ inch to $\frac{1}{16}$ inch between the valve seat portion 22 and the bottom of the recess accommodating same. The disc seats in the bushing recess approximately $\frac{3}{32}$ inch in advance of the valve seat portion 22, thus substantially arresting the flow and establishing a back pressure which retards the primary valve to a slow closing movement.

When the primary valve is opened the bottom of the disc receiving recess restricts the disc to its limited field of action. When the primary valve is closed the disc rests slightly below the seat 15. Of course the disc rises above the seat 15 when the valve is open, but it is at all times slightly below the valve seat portion 22 and consequently seats earlier to cushion the closing of the primary valve.

Preferably the ribs 54 are integral with member 29 but if desired, a separate ribbed member may be secured by any desired means to member 29.

While I have disclosed but a single specific embodiment of my invention, such is to be considered as illustrative only, and not restrictive, the scope of the invention being defined in the subjoined claims.

What I claim and desire to secure by U. S. Letters Patent is:

1. A flush valve comprising a casing having inlet and outlet openings, a bushing vertically supported in the casing within said outlet opening and whose upper end provides a primary valve seat, a hollow primary valve including a flexible bushing having an upper horizontal portion clampingly engaged with said casing and a lower horizontal seat engaging portion, a by-pass valve in said primary valve for establishing balanced pressure within and without the valve, an opening in said hollow primary valve concentric with said first bushing, a gasket defining a secondary valve seat around said opening, a secondary valve having an imperforate bottom portion normally resting on said secondary valve seat and a vertically disposed cylindrical wall, a rocker member within said cylindrical wall and vertically movable relative thereto, handle operated means supported by said casing for tilting said rocked member and thereby the secondary valve to unseat same and unbalance the pressures on the primary valve for opening thereof by such unbalanced pressures, and a vertically disposed cylindrical member within said first bushing and having its upper end secured to said primary valve around the opening therein, a spring within said cylindrical member normally biasing said secondary valve to seating position, and guide means between said member and said bushing.

2. A flush valve including a casing formed with a water inlet and a water outlet, a bushing in the casing formed at its upper end with a valve seat, a primary valve cooperating with said seat and formed with a central opening, a discharge sleeve arranged in and passing through and beyond the opening in the primary valve, a flexible member overlying and forming part of said primary valve and having a portion extending in contact with and snugly fitting an upstanding portion of the primary valve and another portion connected to the casing, a secondary valve overlying and normally closing the opening in the primary valve and having an extended wall in spaced parallel relation to the upstanding portion of the primary valve to provide a pressure space overlying the primary and secondary valves, a rocker sleeve movable within and bearing against the extended wall of the secondary valve, said sleeve having an inturned flange at the upper end, and a manually-operable lever having a boss to fit within the flange and rock the sleeve, the operation of the lever rocking the sleeve to open the opening in the primary valve to the pressure space and to the casing outlet and relieve the downward pressure on the primary valve, means connecting the pressure space to the inlet of the casing, and yieldable means within said discharge sleeve operatively engaged with said secondary valve for biasing same to its seated position in closing the opening in the primary valve.

3. A construction as defined in claim 2, wherein the means connecting the pressure space to the casing inlet includes an opening in the upstanding portion of the primary valve and the flexible member, and wherein said discharge sleeve is concentrically disposed within said bushing with the external wall of the sleeve in substantial spaced relation to the internal wall of the bushing, and vertically disposed ribs on the sleeve engageable with said internal wall of the bushing for guiding the primary valve in a direction axially of the sleeve and bushing.

4. A construction as defined in claim 2, wherein the means connecting the pressure space to the casing inlet includes an opening in the upstanding portion of the primary valve and flexible member, and means for adjusting the size of the opening comprising a generally triangular plate pivotally connected adjacent one apex thereof to the upstanding portion of the primary valve, the plate including a substantially wide portion adjacent the opening and which upon swinging of the plate about its pivotal connection covers the opening to variable extents, and a set screw in the plate adjacent its pivotal connection for retaining same in adjusted position.

5. A construction as defined in claim 2, wherein the lever for rocking the sleeve for tilting the secondary valve is mounted in a fulcrum carried by a cover plate bearing on a seal, said cover plate being secured to the casing and engaging the upper end of the flexible member to limit the area of the pressure space within the casing.

EDGAR F. METZGER.

REFERENCES CITED

The following references are of record in the file of this patent:

UNITED STATES PATENTS

| Number | Name | Date |
|---|---|---|
| 613,802 | Kenney | Nov. 8, 1899 |
| 953,484 | Moore | Mar. 29, 1910 |
| 1,501,331 | Gulick | July 15, 1924 |
| 1,556,442 | Holcomb | Oct. 6, 1925 |
| 1,998,155 | Cadwell | Apr. 16, 1935 |
| 2,204,191 | Sloan | June 11, 1940 |
| 2,227,907 | Lautianen | Jan. 7, 1941 |
| 2,369,104 | Fredrickson | Feb. 6, 1945 |
| 2,388,868 | Ray | Nov. 13, 1945 |

FOREIGN PATENTS

| Number | Country | Date |
|---|---|---|
| 64,639 | Sweden | Feb. 21, 1928 |
| 584,025 | Germany | of 1933 |
| 625,027 | Germany | Feb. 1, 1936 |
| 787,840 | France | July 16, 1935 |